United States Patent
Medina et al.

(10) Patent No.: US 10,390,099 B2
(45) Date of Patent: *Aug. 20, 2019

(54) SYSTEM AND METHOD FOR COORDINATING BACK-UP SERVICES FOR LAND BASED CONTENT SUBSCRIBERS

(71) Applicant: AT&T Intellectual Property I, L.P., Atlanta, GA (US)

(72) Inventors: Douglas Medina, Grain Valley, MO (US); Todd Andrew Fryer, Liberty, MO (US); Nicholas Nicas, Blue Springs, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,527

(22) Filed: Jul. 12, 2018

(65) Prior Publication Data

US 2019/0014389 A1 Jan. 10, 2019

Related U.S. Application Data

(63) Continuation of application No. 14/919,356, filed on Oct. 21, 2015, now Pat. No. 10,051,338.

(51) Int. Cl.
*H04N 21/647* (2011.01)
*H04N 21/643* (2011.01)
(Continued)

(52) U.S. Cl.
CPC ... *H04N 21/64707* (2013.01); *H04N 21/2343* (2013.01); *H04N 21/4622* (2013.01);
(Continued)

(58) Field of Classification Search
CPC ......... H04N 21/64707; H04N 21/6112; H04N 21/6143; H04N 21/6405; H04N 21/6473; H04N 21/2343; H04N 21/4622
See application file for complete search history.

(56) References Cited

U.S. PATENT DOCUMENTS 5,351,130 A 9/1994 Dugan et al.
5,499,046 A 3/1996 Schiller et al.
(Continued)

FOREIGN PATENT DOCUMENTS

WO 2008083384 A3 10/2008

OTHER PUBLICATIONS

"NSTAC Report to the President on Commercial Satellite Communications Mission Assurance", The President's National Security Telecommunications Advisory Committee, Nov. 2009, 98 pages.
(Continued)

*Primary Examiner* — Fernando Alcon
(74) *Attorney, Agent, or Firm* — Guntin & Gust, PLC; Andrew Gust

(57) ABSTRACT

Aspects of the subject disclosure may include, for example, accessing a terrestrial content service that delivers media content to premises of a subscriber for presentation to media processing equipment of the subscriber. An interruption in the terrestrial content service is determined that interrupts the delivery of the media content item to the media processing equipment. An alternative media content item is identified based on the media content item, wherein the alternative media content item is available by way of a direct broadcast satellite service not subscribed to by the subscriber. The direct broadcast satellite service is provisioned to the media processing equipment responsive to the determining of the interruption in the terrestrial content service. Other embodiments are disclosed.

20 Claims, 6 Drawing Sheets

(51) Int. Cl.
  *H04N 21/462* (2011.01)
  *H04N 21/61* (2011.01)
  *H04N 21/2343* (2011.01)
  *H04N 21/6405* (2011.01)

(52) U.S. Cl.
  CPC ..... *H04N 21/6112* (2013.01); *H04N 21/6131* (2013.01); *H04N 21/6143* (2013.01); *H04N 21/6405* (2013.01); *H04N 21/6473* (2013.01); *H04N 21/64322* (2013.01)

(56) References Cited

U.S. PATENT DOCUMENTS

| | | | |
|---|---|---|---|
| 5,864,546 A | 1/1999 | Campanella et al. | |
| 6,301,223 B1 | 10/2001 | Hrastar et al. | |
| 6,308,286 B1 | 10/2001 | Richmond et al. | |
| 6,634,027 B1 | 10/2003 | Johnson et al. | |
| 6,889,385 B1 | 5/2005 | Rakib | |
| 7,095,757 B2 | 8/2006 | Diamond et al. | |
| 7,187,926 B1 | 3/2007 | Henkel et al. | |
| 7,245,874 B2 | 7/2007 | Rest et al. | |
| 7,395,072 B2 | 7/2008 | Gudmundsson et al. | |
| 7,477,597 B2 | 1/2009 | Segel et al. | |
| 8,077,706 B2 | 12/2011 | Wasden et al. | |
| 8,099,272 B2 | 1/2012 | Conway et al. | |
| 8,127,029 B1 | 2/2012 | Blahut et al. | |
| 8,165,060 B2 | 4/2012 | Barroso et al. | |
| 8,310,918 B2 | 11/2012 | Poulson et al. | |
| 8,332,905 B2 | 12/2012 | Jenkin et al. | |
| 8,537,663 B2 | 9/2013 | Poulson et al. | |
| 8,861,341 B2 | 10/2014 | Richardson | |
| 9,037,074 B2 | 5/2015 | Wasden | |
| 9,049,354 B2 | 6/2015 | Wasden | |
| 9,420,325 B2 | 8/2016 | Zelkowitz et al. | |
| 2009/0047016 A1 | 2/2009 | Bernard et al. | |
| 2009/0119696 A1 | 5/2009 | Chow et al. | |
| 2010/0027411 A1 | 2/2010 | Weber et al. | |
| 2011/0145869 A1 | 6/2011 | Rahman et al. | |
| 2011/0321079 A1 | 12/2011 | Lankford et al. | |
| 2012/0036016 A1 | 2/2012 | Hoffberg et al. | |
| 2012/0110630 A1 | 5/2012 | Golobrodsky et al. | |
| 2012/0180098 A1 | 7/2012 | Kim et al. | |
| 2012/0230651 A1 | 9/2012 | Chen et al. | |
| 2012/0297426 A1 | 11/2012 | Ling et al. | |
| 2013/0042280 A1 | 2/2013 | Chen et al. | |
| 2013/0188478 A1 | 7/2013 | Kayser et al. | |
| 2013/0203343 A1 | 8/2013 | Ling et al. | |
| 2013/0219435 A1 | 8/2013 | Pattison et al. | |
| 2014/0057549 A1 | 2/2014 | Ling et al. | |
| 2014/0189756 A1 | 7/2014 | Beals et al. | |
| 2015/0036485 A1 | 2/2015 | Poulson | |
| 2015/0040172 A1 | 2/2015 | Zelesko | |
| 2015/0189346 A1 | 7/2015 | Raikar et al. | |
| 2015/0249512 A1 | 9/2015 | Adimatyam | |
| 2015/0319107 A1 | 11/2015 | Sebastian | |
| 2015/0326891 A1 | 11/2015 | Austin | |
| 2015/0358661 A1 | 12/2015 | Navarro | |
| 2015/0382073 A1 | 12/2015 | Meng | |
| 2016/0014464 A1 | 1/2016 | Baskaran | |
| 2016/0088351 A1 | 3/2016 | Petruzzelli et al. | |
| 2016/0127779 A1 | 5/2016 | Elstermann | |
| 2017/0118531 A1 | 4/2017 | Medina | |

OTHER PUBLICATIONS

Gupta, Sunil, "How Satellites Benefit Cloud-Hosted Applications", Cloud Computing, Connect-World AME, Oct. 2014, 6 pages.

Joyce, Sheila, "Managing and Monitoring a Data Broadcast Network Presented by Sheila Joyce, Geocast Network Systems", Ancillary Data, Metadata, and Datacasting—Enabling Enhancements for Old and New Media, Feb. 2001.

Loo, Suem P., "System Design of an Integrated Terrestrial-Satellite Communications Network for Disaster Recovery", Feb. 2004.

SYSTEM AND METHOD FOR COORDINATING BACK-UP SERVICES FOR LAND BASED CONTENT SUBSCRIBERS

CROSS-REFERENCE TO RELATED APPLICATION

This application is a continuation of U.S. application Ser. No. 14/919,356, now U.S. Patent Publication No. 2017/0118531. All sections of the aforementioned application is incorporated herein by reference in its entirety.

FIELD OF THE DISCLOSURE

The subject disclosure relates to a system and method for coordinating back-up services for land based content subscribers.

BRIEF DESCRIPTION OF THE DRAWINGS

Reference will now be made to the accompanying drawings, which are not necessarily drawn to scale, and wherein.

DETAILED DESCRIPTION

Figure 1:
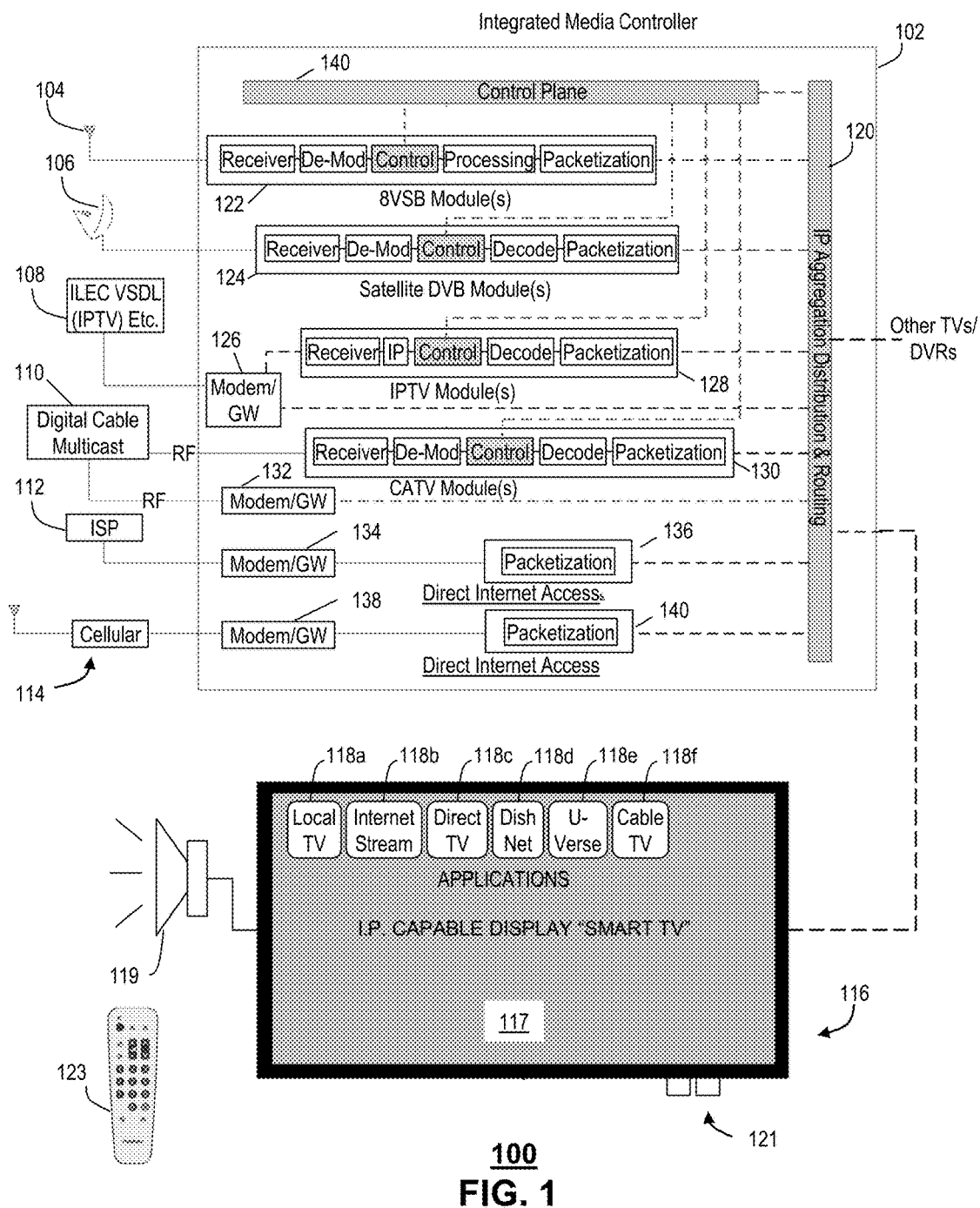
FIG. 1 depicts an illustrative embodiment of system for accessing media services.

The subject disclosure describes, among other things, illustrative embodiments for coordinating back-up media services in response to an "up-stream" interruption of a terrestrial media service. The coordinated back-up media service can be substituted for the terrestrial media service at customer premises equipment, or at other convenient network locations, such as local access points, and/or transport network nodes. The coordinated back-up services can include one or more of Internet services, over-the-air broadcasts, and satellite media services.

One or more aspects of the subject disclosure include a system including a processor and a memory that stores executable instructions that, when executed by the processor, facilitate performance of operations. The operations include accessing a terrestrial content service including delivery of a media content item by way of a terrestrial network to media processing equipment of a subscriber of the terrestrial service. The media content item is presented to the media processing equipment. An interruption in the terrestrial content service is determined that interrupts the delivery of the media content item to the media processing equipment of the subscriber. An alternative media content item is identified based on the interrupted media content item, wherein the alternative media content item is available by way of a direct broadcast satellite service that is not subscribed to by the subscriber of the terrestrial service. The direct broadcast satellite service is provisioned to the media processing equipment of the subscriber in response to the determining of the interruption in the terrestrial content service.

One or more aspects of the subject disclosure include a process that includes accessing, by a system including a processor, a first content service that delivers a media content item by way of a terrestrial network to media processing equipment of a subscriber, for presentation to equipment of a subscriber of the first content service. The system determines an interruption in the first content service that interrupts the delivery of the media content item to the media processing equipment. The system identifies an alternative media content item based on the media content item, wherein the alternative media content item is available by way of a wireless service that is not subscribed to by the subscriber. The system provisions the wireless service to the media processing equipment in response to the determining of the interruption in the first content service.

One or more aspects of the subject disclosure include a machine-readable storage medium, having executable instructions that, when executed by a processor, facilitate performance of operations. The operations include accessing a first media content service that includes user-subscribed media content, wherein the first media content service provides the user-subscribed media content to media processing equipment of a subscriber by way of a terrestrial network. An interruption is determined in the accessing of the first media content service at the media processing equipment. Alternative media content is identified based on the user-subscribed media content, wherein the alternative media content is available by way of a direct broadcast satellite service to which the subscriber has not subscribed. The direct broadcast satellite service is provisioned to the media processing equipment, responsive to the determining of the interruption.

The techniques disclosed herein leverages back-up acquisition assets, such as RF over-the-air broadcast, the Internet, and Direct Broadcast Satellite (DBS) service, e.g., operating in the Ku band, to back-up land-based, or terrestrially acquired media content to terrestrial content subscribers in the event of a local/regional service outage. Presently, when a land-based content subscriber experiences a local or regional service outage for which there are no redundancies, sometimes referred to as an "up-stream" outage, the customer experiences a loss of service until the up-stream issue is resolved, lending to a negative customer experience. Despite most land-based content subscriber networks having multiple redundancies there have been occasions in which outages have occurred.

Terrestrial content subscribers can experience service outages at a local and/or regional level. Consequently, one outage can result in a temporary loss of service to a large number of subscribers over the affected area. A back-up service model that relies on wireless services, such as a DBS service, does not rely on the same terrestrial network to provide media content to the terrestrial content subscriber. This allows for a wireless delivery of services to transcend any affected "in-ground" facilities serving the terrestrial content subscriber.

By way of example, a local or regional DBS service deployment package can be provided to decrypt one or multiple services for the purpose of replacing the "up-stream" out of service channel(s) of the land-based content subscribers. References to "up-stream" in this context refer to network and/or media content sources from a perspective of a reference node, such as the terrestrial subscriber's premises. The back-up DBS service deployment package can be initialized in response to a land-based service outage. As will be described in more detail below, the back-up service can be initiated by one or more of a national or regional operations center, subscriber equipment, or a third party, e.g., a monitoring service.

One approach relies upon a standard off the shelf DBS service receiver(s) to acquire and decrypt media content, such as TV channels, particular programs, or on-demand content, for the purpose of creating an IP multicast that can be substituted for any up-stream out of service. The DBS receivers are relatively inexpensive, e.g., in comparison to a traditional cable set-top box, and can be provided to cable subscribers as a matter of course, even though the cable subscribers have no intention of subscribing to DBS service. The DBS receivers can be located, without restriction, at some customer premises, e.g., at residential gateway, or at some other regional terrestrial service distribution point or node, such as a Digital Subscriber Access Multiplexer (DSLAM). An off-the-shelf apparatus, such an MPEG cherry picker (MUX), can be used to assign a correct Multicast IP of the H264 content it receives from the satellite feed and provision it to an application running on a content subscriber's delivery apparatus. The cherry picker multiplexer can function to cull out MPEG packets of only the desired programs and assemble them as output MPEG transport streams. This back-up alternate acquisition content can be activated, or otherwise utilized in a situation, e.g., at the subscriber's location or at some other distribution point, in response to a determination that there is a link but no content situation.

FIG. 1 depicts an illustrative embodiment of a system 100 for accessing media services. The system 100 includes an integrated media controller 102 that exchanges data with one or more external media services. In the illustrative example, the system 100 includes one or more of a broadcast television antenna 104 that accesses a broadcast television service, a satellite terminal 106 that accesses a direct broadcast satellite service, and a first network device 126, such as a modem or gateway that accesses an Internet Protocol Television (IPTV) service 108. Alternatively or in addition, the integrated media controller 102 is in communication with one or more of a digital cable multicast service 110, an Internet service by way of Internet service provider (ISP) 112 equipment, and a cellular service by way of a cellular access terminal 114.

The integrated media controller 102 is in further communication with a display device, such as a connected TV 116, sometimes referred to as a hybrid TV or a smart TV. In some embodiments, the display device is separate from a media processor, or set-top box that provides functionality related to smart TV. The smart TV 116 can include integrated Internet and/or Web features, and represents a convergence of sorts between computers, television sets and set-top boxes. In addition to traditional functions of legacy television sets and set-top boxes, smart TVs 116 can also provide one or more of Internet TV, online interactive media, over-the-top content, as well as on-demand streaming media, and home networking access.

In the illustrative embodiments, the smart TV 116 includes a display area 117 including one or more icons 118a . . . 118f (generally 118). The icons 118 are related to various applications hosted by, or otherwise accessible by way of the smart TV 116. The illustrative example includes a "Local TV" icon 118a relates to a local TV application that interacts with over-the-air broadcast television services. An Internet stream icon 118b relates to an Internet stream application that interacts with the IPTV service 108. A "Direct TV" icon 118c and/or "DishNET" icon 118d interact with direct broadcast satellite services. Likewise, a U-Verse® icon 118e and/or a "Cable TV" icon 118f interacts with one or more of the available cable TV services.

A selection of any one of the icons 118 can launch or otherwise activate a corresponding application that facilitates access to a corresponding service. For example, if a user selects the "Local TV" icon 118a, the display 117 and/or audio system 119 (speaker, headphones, headset, amplifier, etc.) can present media content (video and/or audio) to a viewer/listener. In this example, the media content would be obtained from the broadcast television service by way of the antenna 104. It is understood that the broadcast television service can offer a channel lineup that includes a number of channels, each with respective programmed media content. Accordingly, a particular media content item presented at the smart TV 116 can depend upon a time of day and a tuning status, i.e., channel, of the smart TV 116 and/or set-top box 116. Selection of a particular channel can be accomplished by any means, such as physical user controls, e.g., buttons 121, at or on the smart TV 116, a graphical user interface presented on the display 117, and/or by way of a remote control device 123, including a user's mobile communication device or cell phone.

Other terrestrial, or so-called "ground based" services can include the digital cable multicast service 110. It is understood that the cable service 110 can offer a channel lineup that includes a number of channels, each with respective programmed media content. Accordingly, a particular media content item presented at the smart TV 116 can depend upon a time of day and a tuning status, i.e., channel, of the smart TV 116 and/or set-top box or DVR. Other content can be provided by way of a pay-per-view service, in which a particular media content item is provided to equipment of a subscriber, based on payment received for the media content item. It is also understood that at least some cable services 110 offer on-demand content that can be uniquely provided to equipment of the subscriber based on a selection of the media content item, e.g., responsive to a selection of the media content item from an on-demand catalog. Such on-demand content can be provided in a unicast stream to the subscriber equipment 102 for presentation at the display device or smart TV 116.

Other sources of media content available to subscriber premises equipment 102, 116 include streaming media available from the public Internet. This can include pre-programmed channels, sometimes referred to as "over the top" presentation of media content, e.g., by way of a channel lineup. Examples include American Express interactive television and branded content provided by way of a video-on-demand channel. Such content can be accessed by way of the internet service provider 112. Other streaming content can include, without limitation, other vide sources, such as Internet channels associated with network broadcast and/or cable channels. Such Internet channels can stream content that corresponds to a corresponding broadcast/cable channel, or channel lineup. By way of example, CBS provides a streaming TV service that allows subscribers to watch live content, as it happens and classic shows online.

In some embodiments, media content is received by way of an Internet Protocol Television (IPTV) service 108. Such services provide television (and/or radio)-style services delivered through an Internet protocol suite over a packet switched network, such as a Local Area Network (LAN) or the Internet. Media content can include live content related to current TV shows, time shifted programming, sometimes referred to as catch-up TV (replaying programmed content broadcast hours or days ago), or start-over TV (replaying current TV show from its beginning), Video on Demand (VOD), and the like.

Still other sources of media content available to subscriber premises equipment include cellular service by way of the cellular access terminal 114. Cellular services can provide access to content available through the Internet, including content especially prepared or otherwise intended for presentation at mobile devices. Such content is sometimes referred to as "small screen" content and can include any of the foregoing media content examples, such as cable channel lineups, broadcast TV channel lineups, direct broadcast satellite channel lineups, on-demand content, private content, and the like. Media content intended for mobile devices can supply a portion of or a complete channel lineup, including live-streaming and/or on-demand content. Media content can be reformatted, e.g., to preserve channel bandwidth, by re-sizing and/or changing resolutions.

It is understood that any of the aforementioned media content sources or services can include provisions for receiving communications from subscriber premises equipment and/or from other equipment on behalf of a subscriber. Such communications, e.g., data or messages, are sometimes referred to as "up-stream" content and can include, without limitation, one or more of authentication information, channel selections, subscriptions and/or subscribed content and/or services, on-demand content requests, and the like. Related communications from customer equipment, e.g., to identify programming, to request and/or modify services, including subscription services and/or back-up services, can use any means of communication. Examples include, without limitation, short message service (SMS) or text messages, email messages, telephone calls including data calls, e.g., dual tone multi frequency (DTMF) tones, Voice over IP, video teleconference, video text, and the like. Messages can be relayed over the same channels or services providing the subscription services, including the back-up services. Alternatively or in addition, messages can be relayed over different channels, such as over the Internet, plain old telephone service (POTS), cellular mobile service, and the like.

It is also understood that service providers can provide communications to the subscriber premises equipment. Such communications can include, without limitation, program guides, software updates, e.g., for related applications and/or equipment, and authorizations, e.g., cryptographic material, keys, passwords or codes for decryption, descrambling and/or otherwise accessing services and/or particular content as in channels, pay-per-view programs and on-demand content. Such "down-stream" communications can be provided in one or more of the streaming media channels or programs, e.g., by way of metadata, embedded audio, and the like. Alternatively or in addition, down-stream communications can be provide by a separate, e.g., dedicated channel, or even by way of a separate network. For example, communications between a direct broadcast satellite service provider and subscriber premises equipment can be accomplished by one or more of an Internet connection by way of the Internet service provider 112, a wireless channel by way of the mobile cellular service 114 and/or a cable service provider by way of the cable services 110. As disclosed herein, any of the foregoing examples of communications between a media content provider and subscriber equipment can be used to coordinate a response to a planned and/or unplanned service outage of the same service or a different service.

In the illustrative example, the integrated media controller 102 includes one or more modules that process media content received by the respective services. Accordingly, the integrated media controller 102 can include a modem and/or gateway 138 and/or a packet processor 140. The modem 138 and/or packet processor 140 are connected between an IP aggregator 120 and the cellular terminal 114. Wireless content received over the mobile network by the cellular terminal 114 is processed by the corresponding equipment 138, 140 into IP packets that can be routed or otherwise directed for further processing and/or presentation to the display device 116. Although one display device 116 is illustrated, it is understood that the IP aggregator 120 can serve more than one display device 116. Other display devices can include devices within the same customer premises. Without limitation, other display devices can include devices outside of the customer premises. This can include devices in another customer premises, such as a neighbor. Alternatively or in addition, any of the display devices 116 can include a digital video recorder (DVR). The DVR can be integrated within the display device 116 and/or separate from the display device 116, as in a set-top box or as a dedicated recorder.

In some embodiments, the integrated media controller 102 includes a modem and/or gateway, such as a cable modem 134 and/or a packet processor 136 coupled between the Internet service provider 112 and the IP aggregator 120. The cable modem 134 and/or packet processor 136 are connected between the IP aggregator 120 and the ISP 112. Thus, IP content received over the Internet is processed by the corresponding equipment 134, 136 into IP packets that can be routed or otherwise directed by the IP aggregator 120 for further processing and/or presentation to the display device 116.

Likewise, the integrated media controller 102 can include a cable modem 132 and/or other cable processing modules 130. The cable modem 134 and/or packet processor 136 are connected between the IP aggregator 120 and the cable service provider 110. Thus, IP content received over the cable network is processed by the corresponding equipment 132, 130 into IP packets that can be routed or otherwise directed by the IP aggregator 120 for further processing and/or presentation to the display device 116. The other cable modules 130 can include, without limitation, a receiver, a demodulator, a control module, a decoder and/or a packet processor. In some embodiments, the cable modules are similar to or otherwise provided by a set-top box. Equipment for processing IPTV services 108 can be similar to the cable service equipment, e.g., including one or more of a cable modem 126 and/or IPTV processing modules 128.

The integrated media controller 102 can include Direct Broadcast Satellite (DBS) processing modules 124, e.g., including, without limitation, a receiver, a demodulator, a control module, a decoder and/or a packet processor. The DBS processing modules 124 are coupled between the satellite terminal 106 and the IP aggregator 120. Likewise, the integrated media controller 102 can include terrestrial video broadcast processing modules 122, e.g., including, without limitation, a receiver, a demodulator, a control module, a decoder and/or a packet processor. The terrestrial video broadcast processing modules 122 can be coupled between the antenna 104 and the IP aggregator 120.

In more detail, the DBS processing modules 124 can include one or more of a de-scrambler or decryption module to unlock or otherwise provide access to media content offered by a satellite service provider. The DBS processing modules 124 can include a tuner that responds to an input from a user that tunes the DBS processing modules 124 to one of a number of available satellite service channels. In some instances, a block down-conversion of a combined Lowe Noise amplifier-Block down-converter (LNB) (not shown) provides multiple satellite service channels to DBS processing modules 124, allowing for selection of a particular channel to occur within the DBS processing modules 124. A decoder decodes encoded channel signals, e.g., converting digital MP3, MPEG-2, H.264 or MPEG-4 signals to another format, such as analog NTCS format, HDTV format, and the like. It is understood that the down-converted RF signal can support multiple channels simultaneously, e.g., being distributed by the RF distribution network for processing by multiple satellite receivers.

By way of non-limiting example, DirecTV® and Dish Network®, are American DBS service providers. They transmit digital satellite television and audio to households and businesses in the U.S., Latin America and the Caribbean. DBS is also considered a direct competitor of cable television providers. DirecTV® and Dish Network® are registered trademarks of DirecTV, LLC and Dish Network LLC, respectively. These providers emit their core programming from satellite in geostationary orbits at locations between 100 W and 120 W western longitudes.

In the illustrative example, the integrated media controller 102 also includes a control processor 140 in communication with one or more of the media processing modules 122, 124, 128, 130. In some embodiments, protocols used for coordination and/or provision of digital media services, e.g., including one or more of the terrestrial broadcast services, DVB services, IPTV services, and cable TV services can include a control portion and a user or data portion. For example, the control portion can include IP packets that coordinate and/or provision access to the respective services. The control packets can relate one or more of subscriptions, access, authorizations, billing, maintenance, quality assessment, and the like. The control packets can be directed to subscriber premises equipment from a service provider and/or an intermediate network node. Alternatively or in addition, the control packets can be directed from subscriber premises equipment to one or more of the service provider or an intermediate network node. Exchange of such control packets is sometimes referred to as a "control plane."

Likewise, the data portion can include IP packets that provide media content according to the respective services. The data packets can include video, audio, images, data, software, application programs and the like. The data packets can be directed to subscriber premises equipment from a service provider and/or an intermediate network node. Alternatively or in addition, the data packets can be directed from subscriber premises equipment to one or more of the service provider, an intermediate network node or subscriber premises equipment of another subscriber, e.g., a neighbor. A protocol exchange of such data packets is sometimes referred to as a "user plane" or a "data plane."

Although the examples disclosed herein refer to the integrated media controller 102 as being customer premises equipment, it is understood that the integrated media controller 102 could alternatively or in addition, be provided at other distribution points in a media distribution network. Examples include, without limitation, provisioning of one or more integrated media controllers 102 at one or more of a local network node of an access network, such as a Digital Subscriber Line Access Multiplexer (DSLAM), an intermediate transport node of a Central Office (CO) or Video Switching Office (VSO) and/or a Video Headend Office (VHO) and/or at a Super Headend Office (SHO).

In operation, any smart TVs 116 or set top boxes that are actively receiving satellite media content from a satellite signal collected at the satellite terminal 106, would be tuned to a channel associated with particular media content provided on that channel. It is generally understood that the satellite service media content can be provided in a broadcast mode, e.g., according to a program lineup or schedule. Under such conditions, the program lineup can be identified by an electronic program guide identifying channels, time slots and programmed media content. Accordingly, knowledge of a tuned channel and a time is sufficient to allow for an identification of a media content item being presented on display equipment attached to the smart TV 116 and/or recorded at a DVR. Alternatively or in addition, the satellite signal includes metadata that includes identifying information. Different metadata can be provided for each programmed channel of the satellite service lineup, such that access to metadata of a tuned channel can identify a media content being presented on the display equipment attached to the STB 210 and/or recorded at a DVR. It is also understood that in some embodiments, satellite service media content can be provided on a pay-per view basis and/or as an on demand basis.

In some embodiments, a national channel line-up of a terrestrial service, e.g., U-Verse®, can be backed up with RF assets offering the same national channel line-up, offering tremendous flexibility and reliability. For situations in which the same content provider offers both terrestrial and RF, e.g., DBS, services, such backing up of a channel line-up can be a trivial matter, and may already exist if the same channel line-up is offered by both services. Using small DBS antennas at key points in the network such as VHO's/VTN's/IO/CO's and even take off points in the OSP (outside plant) the solution scales quickly to the area in need of back-up. When activated after certain OOS (out of service) criteria are met a dormant (dark to customer) application can be triggered on the customer premises equipment, such as a set-top box, a residential gateway, a smart TV, a DVR, or in some instances, a dedicated detector.

The IP aggregator 120 can identify what media services are being delivered to any display devices 116. The alternative media content items can include, without limitation, other versions of the same media content items. For example, a direct broadcast satellite service provider may offer some or all of their channel lineups in an ancillary service for delivery over terrestrial networks. The ancillary service can include, so-called, small screen versions of the media content items, generally intended for consumption on mobile devices. Thus, a high-definition version, including ultra-high-definition or "4K" version of a media content item might be delivered by the satellite service according to the satellite signal; whereas, a standard definition, low-definition or otherwise small-screen version can be provided via a cable service and/or via an IP media stream.

Figure 2:
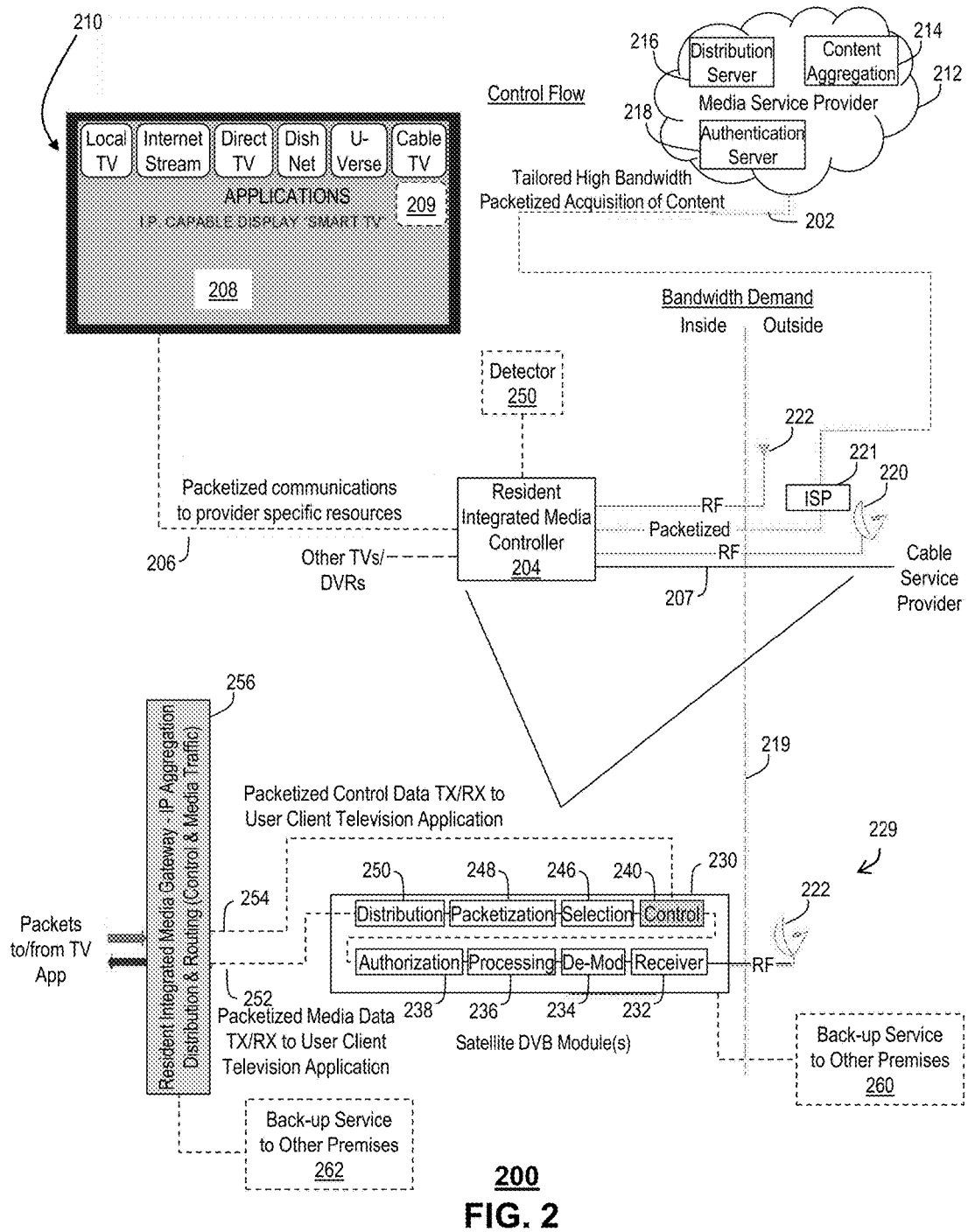
FIG. 2 depicts an illustrative embodiment of another system for accessing media services.

FIG. 2 depicts an illustrative embodiment of another system 200 for accessing media services. The system 200 includes customer premises equipment, including an Internet-enabled, connected or smart display device, e.g., smart TV 208. The smart TV 208 is coupled to a residential integrated media controller device, such as residential gateway and/or an integrated media controller 204. The smart TV 208 accesses packetized communications with service provider resources by way of a connection 206 between the smart TV 208 and the integrated media controller 204. In some embodiments, the integrated media controller 204 can be connected to other subscriber premises equipment, such as other smart TVs.

The integrated media controller 204 is in communication with a terrestrial, cable service provider 207, e.g., providing access to a channel line-up of programmed content, live content, on-demand content, and perhaps other services including interactive applications, gaming, and the like. In the illustrative example, the cable service provider 207 represents a primary, subscribed-to service. The integrated media controller 204 is in further communication with one or more back-up services. In the illustrative example, these services include a DBS service 220, an Internet service 221, and a terrestrial broadcast, or over-the-air TV service 222.

In the illustrative example, the Internet service 221 provides access to media service provider resources 212 via the Internet connection 202. The media service provider resources 212 can include one or more of a content aggregator 214, a distribution server 216, and an authentication server. It should be understood that, without restriction, any of the back-up services disclosed herein can be provided by the same media service provider, e.g., the cable service provider 207, a different media service provider that may include competitor cable service providers, or some combination of such providers.

A reference line 219 is illustrated to distinguish between "inside" and "outside" in relation to bandwidth demand. If bandwidth resources are utilized from the integrated media controller 204, e.g., from the DBS service 220 or the over-the-air TV service 222, then the bandwidth demand of a back-up service is free of any related bandwidth demands and/or costs of wide area network resources delivered by the internet services provider 221.

The smart TV 208 includes one or more application files or "apps" 210. The apps 210 can include service provider apps to access service provider resources. For example, there may be an app 210 to access media content offered by the cable service provider 207, e.g., including a number of channels providing pre-programmed content (multicast), an electronic program guide identifying the channel line-up, programs, times, descriptive content related to programs, etc. In some instances, the app 210 provides a catalog of on-demand content that can be streamed to the smart TV 208 (unicast) in response to a request by the user. Other apps 210 can relate to the Internet service 221, over-the-air TV, DBS services, and the like.

In at least some embodiments, the smart TV 208 includes a back-up services app 209. The back-up services app 209 can facilitate a transition to one or more alternative media services in the event of an up-stream outage. In some embodiments, the back-up services app 209 monitors availability of another service, such as the primary, e.g., cable service 207. An up-stream service outage of the primary cable service 207 can be detected when there is a link, but there is no content. A lack of content can be identified by various techniques, such as identification of a placard, or similar screen that may be presented to a viewer display during an outage, detection of the media content itself, e.g., audio and/or video, that is indicative of a no-content situation. For example, video and/or audio content indicative of random content, or noise can be used as an indicator. Alternatively or in addition, the back-up services app 209 can receive a message or signal from another source, such as the cable service provider, the media service provider, or some other third party monitoring availability of media services.

It is understood that one or more other detectors 250 (shown in phantom) can be optionally provided, at any point in the system 200 to detect such link but no content situations. In the illustrative example, the detector 250 is provided at the integrated media controller 204. The detector 250 can use any of the detection techniques disclosed herein, to identify a service interruption or outage, providing an indicator when an outage is detected. The indicator can be provided to one or more of the back-up services app 209, the integrated media controller, the smart TV 208, the back-up service provider 220, 221, 222.

In some embodiments, the back-up services app 209 includes one or more configurable features. The configurable features can include, without limitation, identification of any back-up service provider(s), e.g., DBS service provider, an order of preference for situations in which more than one back-up service provider is available, an adjustable time delay before a back-up service is activated—to prevent a transition to backup services for short duration interruptions, e.g., on the order of a few seconds, user identification, and/or other authorization information, such as subscriptions, equipment, e.g., smart TV 208, residential system 200 configurations, and the like. The back-up services app 209 can include programming and/or logic that implements one or more rules that determine aspects of any transitions, such as when and under what conditions to switch between the regular and alternate content. The rules can include further restrictions, such as allowed alternative content sources, blocked alternative content sources, user preferences, and the like.

In the illustrative example, the user television 208 has a resident interactive application program 209 that can be launched to access and control packetized media from a remote server, or from a local resource. Such interactive applications can be provided by one or more service providers, having been developed by the service providers to interact with their local or remote hardware modules. This can include customer premises equipment, e.g., set-top boxes, satellite boxes, satellite service low-noise amplifier/block down converter (LNB) boxes, and the like. The local and/or remote service provider hardware modules are accessed and can be directly controlled by the resident interactive application program 209, e.g., by a secure session. Once the resident interactive application program 209 has authenticated access to the resource, it can request that media-carrying packets be delivered to the user television 208 for de-packetization and decoding to obtain video, audio and/or other data.

The alternative media content can take the form of a packet stream, e.g., a media stream according to a streaming protocol, such as MPEG-2 or MPEG-4, MP-3, and the like. The media content and the alternative media content can include, without limitation, one or more of video content, audio content, data, text, images, and the like. In some embodiments, the media content can include social media content, gaming content, e.g., multiplayer including massively multiplayer games. It is also generally understood that any media content or alternative media content can include metadata that can include descriptive information about the media content item. Descriptive information can include, without limitation, a program identifier, a program title, a program source, e.g., studio, actors in the program, a genre, viewer and/or critical reviews, an industry standard rating, e.g., general audience, mature content, language, nudity, violence, start time, end time, duration, and the like.

Referring again to the system 200 of FIG. 2, a detailed example of a portion of a DBS back-up infrastructure 229 is shown. The DBS back-up infrastructure 229 includes a DBS satellite antenna terminal 222, and a DBS processor 230. The DBS processor 230 can include one or more of a receiver 232, a demodulator 234, a satellite signal processor 236, an authorization module 238, a control module 240, a selection module 246, a packetization module 248 and a distribution module 250. The DBS processor 230 receives RF signals from the satellite antenna terminal 222. It is understood that in at least some applications, the satellite antenna terminal 222 includes an LNB (not shown) that provides an RF processed and block down-converted signal received from one or more satellite transponders. It is also understood that in at least some embodiments, the DBS processor 230 is a resident media controller interface module, e.g., a satellite module of the integrated media controller 102 (FIG. 1).

The receiver module 232 can include one or more of signal conditioning, e.g., amplification, filtering, frequency translation, and the like. The demodulator 234 can demodulate an output signal from the receiver module 232 to obtain information content borne by an RF signal from a satellite transponder. The processing module 236 can perform, without limitation, processing of the demodulator output, e.g., to apply one or more of error correction, encryption/decryption, data interpretation, and the like. The authorization module 238 can be used to coordinate authorization to access content of the DBS service. The authorization can include, without limitation, identification of one or more of a subscriber, equipment of the subscriber, and subscriber premises, access to encryption/decryption keys, or other information to access scrambled or otherwise protected media content.

The control module 240 can be in communication with one or more of the other modules 232, 234, 236, 238, 240, 246, 248, 250. In some embodiments, the control module 240 can be in communication with one or more other entities, such as the smart TV 208, other smart TVs or set-top boxes, digital video recorders. In at least some instances, the control module 240 can be in communication with one or more of a terrestrial media services provider, a back-up media services provider or a third-party that facilitates or otherwise coordinates access to back-up media content.

The selection module can select a media content item from among a number of media programs and/or channels. The media content item, e.g., a scheduled program of a selected channel based on a current time, is directed to the packetization module 248 that creates a corresponding IP packet stream. The distribution module 250 directs the IP packet stream to one or more smart TVs 208 of the subscriber premises.

The system 200 includes an IP aggregation, distribution and routing module 256. The IP module 256 is in communication between equipment of the DBS back-up configuration 229, e.g., the DBS processor 230, and one or more media processing and/or presentation devices, such as the smart TV 208. The IP module 256 exchanges packetized media data between the resident interactive application program 209 of the smart TV 208 and the back-up service provider. It is understood that packet exchange can be one directional, as in packetized media content received from the back-up media service provider, or bi-directional. For example, the resident interactive application program 209 can exchange packetized data with one or more of the DBS processor 230 and equipment of the back-up service provider.

It should be understood that the resident integrated media controller 204 can include an IP aggregator that facilitates access to back-up services during up-stream service outages. The controller 204 can be located on customer premises and/or at some other up-stream network node. Accordingly, it is envisioned that the technique disclosed herein of preparing IP multicast stream(s) of back-up media content can be distributed to one or more smart TVs 208 of a single customer premises, or to one or more smart TVs of multiple customer premises.

In some embodiments, a DBS service at one subscriber premises provides back-up service to one or more other subscriber premises. Consider a configuration in which one premises comprises the system 200. Satellite services are received at the satellite terminal 222. A signal of the satellite services collected by the satellite terminal 222 can be provided to equipment at one or more other premises at 260. In some embodiments, an RF output of the LNB of the satellite terminal is switched or otherwise divided or directed to one or more of the DBS processor 230, a DBS processor and/or an integrated media controller of the other premises. An example satellite system comprising an intelligent switching module is disclosed in U.S. Patent Application, entitled "System and Method for Replacing Media Content," and assigned application Ser. No. 14/919,373, filed on Oct. 21, 2015, which is incorporated herein by reference in its entirety.

In some embodiments, a determination is made that the media processing equipment cannot process data formatted according to the direct broadcast satellite service. Responsive to such a determination, the alternative media content formatted according to the direct broadcast satellite service, is reformatted to obtain updated alternative media content having a format compatible with the media processing equipment. The updated alternative media content can be sent to the media processing equipment. For applications in which a media service from equipment of a first subscriber, e.g., at a first customer premises, is used to supplement or otherwise provide back-up media service to equipment of another. Considering the possibility of such a distributed back-up architecture, it is envisioned that one or more of the techniques disclosed herein can be accomplished by equipment of the first subscriber, equipment of another entity receiving the back-up services, e.g., media processing equipment of a neighbor's premises and/or some other network accessible device, such as a web server.

By way of non-limiting example, an up-stream outage to equipment of a first terrestrial subscriber is detected. The detection of the outage can occur at equipment of the first terrestrial subscriber and/or at equipment of a service provider. The service provider can include, without limitation, the terrestrial service provider providing terrestrial media services to the equipment of the first subscriber, or a back-up service provider, which can include an alternative media services provider, such as a DBS service provider. Once the outage has been detected, an access point to the alternative media services is identified. The access point can include the equipment of the first terrestrial subscriber, e.g., if the first subscriber equipment includes a DBS terminal and processing equipment. Alternatively or in addition, the access point can include equipment of another subscriber, e.g., a neighbor of the first terrestrial subscriber. In the latter scenario, the neighbor's equipment would include a DBS terminal and/or processing equipment.

Once identified, the alternative media services can be provisioned as back-up services to accommodate delivery of alternative media content to the equipment of the first terrestrial subscriber. The provisioning can include providing authorization and/or access to media content of the alternative media services. The authorization and/or access can include one or more of equipment of the first terrestrial subscriber, equipment of the neighbor or equipment of some other access point used to access the alternative media services during the outage.

Consider a situation in which a scrambled or otherwise encrypted satellite signal is received by the neighbor's equipment. A provisioning of a backup service to the first terrestrial subscriber can include an access and/or authorization code, and/or encryption key can be provided to the neighbor's equipment to allow the neighbor's equipment to access the content for transport to the first terrestrial subscriber equipment. Alternatively or in addition, the access and/or authorization code and/or encryption key can be provided to the equipment of the first terrestrial subscriber. In some instances, the satellite signal need not be descrambled or otherwise decoded at the neighbor's equipment. Instead, the scrambled and/or encrypted signal is transported to the first terrestrial subscriber's equipment at which point it can be descrambled, decrypted or otherwise accessed. Management of the codes or keys can be by any means, including Internet, SMS messages, email messages, machine to machine communications, telephone messages, metadata in the satellite signals, and so on.

The RF output of the satellite terminal 222 can be processed by equipment at the other subscriber premises in a manner similar to that disclosed herein. Namely, a back-up service providing a substitute media content item, program channel, and/or channel line-up can be provided in response to an up-stream interruption to a terrestrial service delivered to the other premises. In some embodiments, an IP multicast stream is generated at the IP module 256, based on terrestrial media content of another subscriber premises. The IP multicast stream 262 can be provided as a back-up service to the other premises.

It is understood that in at least some instances, the same programming content may not be available from other network sources depending on one or more of the program, the time, available sources, etc. In such instances, the resident interactive application program 209 can be configured to facilitate access to a suitable replacement alternative content item. Such suitable replacement content can be determined according to one or more of a genre, actor(s), producer, studio, rating, and the like. For example, if the smart TV 208 is tuned to a particular episode of "Modern Family," the resident interactive application program 209 can search a schedule and/or directory 224 of alternate media content to identify a suitable replacement. The suitable replacement in the illustrative example might include another episode of "Modern Family" The other episode can be selected based on further detail, such as another episode from the same season, or close to the same season. Another episode dealing with similar subject matter, such as a story that focuses on one of the same actors can be selected, as well as other shows that may include the same actors, other family shows, and the like. In this manner, an interruption of a broadcast program can be replaced by an on-demand content of the same or similar program in response to an outage. In some embodiments, the replacement content can re-start from its beginning, or continue from a comparable point in a progression of the program.

It is envisioned in at least some instances that suitable replacement content can include advertising content. The selection of any particular advertising content to be substituted during outages can be based on perceived user demographics based on the particular content tuned to by the smart TV 208 at the time of the outage. Alternatively or in addition, the selection of alternative content that includes advertising can be based on one or more of user preference, subscriber demographics, past viewing history, and the like.

Figure 3:
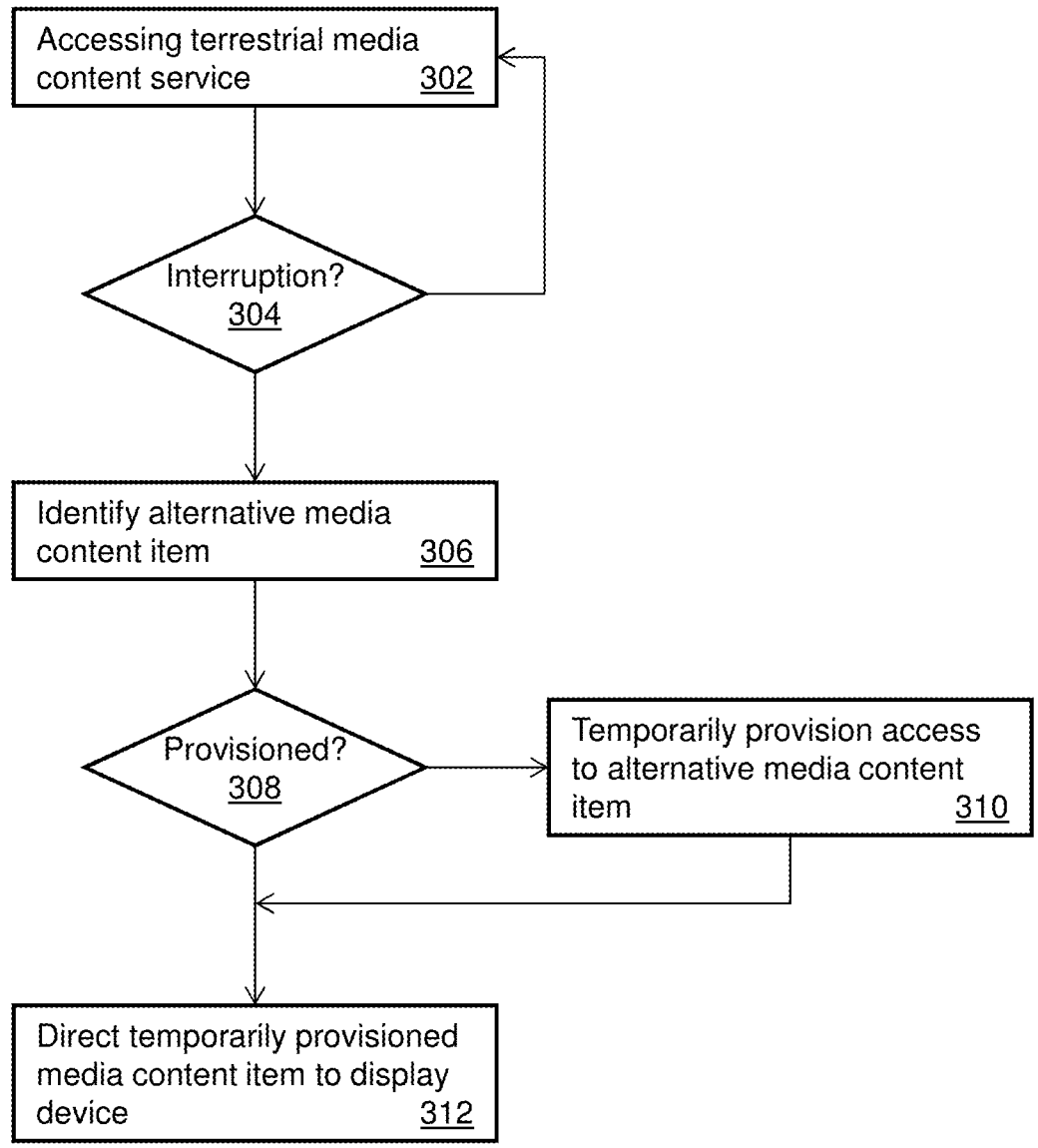
FIG. 3 depicts an illustrative embodiment of a method used in portions of the system described in FIGS. 1-2.

FIG. 3 depicts an illustrative embodiment of a process 300 used in portions of the systems 100, 200 described in FIGS. 1-2. According to the process 200, a terrestrial media content service is accessed at 302. The terrestrial service can include any media access or media content service provided to presentation equipment that presents the media content to users. For example, the terrestrial service can include traditional cable service, including digital subscriber line service, coaxial cable service and fiber optic delivery service. In some embodiments, the terrestrial service includes an Internet service, e.g., provided by an Internet service provider. It is understood that although media content can be delivered for presentation to premises equipment according to a particular terrestrial technique, network transport of source media content to the customer premises can include one or more different technologies. For example, a cable service provider can provide cable service to a cable subscriber premises by way of a coaxial cable. The media content, e.g., a network broadcast channel, may provide content to a super headend office by way of a satellite service. Without restriction, the terrestrial media content service can be a subscribed to service or an unsubscribed service.

An interruption to the delivery and/or receipt of the terrestrial media content service is determined at 304. Such interruptions can result from unplanned technical difficulties, such as a failure of equipment of a media content source, or of any communications and/or networking equipment between the source and a point at which the interruption is observed. Without restrictions, interruptions can also result from atmospheric conditions, e.g., precipitation, celestial conditions, e.g., solar fades that interrupt an over-the-air portion of a terrestrial service. Interruptions can also result from planned interruptions as may result from planned maintenance, upgrades and the like.

The interruptions to the delivery of terrestrial services can be detected by one or more elements of the systems 100, 200 of FIGS. 1-2, and/or by equipment of the media content source and/or the media service provider. Consider a situation in which a smart TV 208 (FIG. 2) is receiving terrestrial content by way of a cable service provider application. If there is an upstream interruption, e.g., occurring within the service provider network and/or at the media content source, the interruption can be detected at equipment at the subscriber premises. This can include detection at the smart TV 116, 208, and/or at the integrated media controller 104, 204, by examining one or more of content packets of the received media content, status signals, and the like. Alternatively or in addition, detection of the outage can be determined by the network service provider and/or the content source.

In response to detecting an outage, alternative media content is identified at 306. Identifying alternative media content can include, without limitation, identifying a corresponding program, channel, and/or channel line-up of the back-up service. For example, the same media service provider can offer a terrestrial media subscription services to traditional cable subscribers and a DBS satellite service to satellite subscribers. In some situations, the common media service provider can offer similar or even identical channel line-ups for both types of services. Thus, in response to a loss of the terrestrial service, a corresponding service can be determined according to offerings of the DBS service. It is understood that a particular channel line-up delivered to any subscriber premises can depend on subscribed to services, and might include less than a full selection of available channels. In such situations, authorization status, e.g., as determined by the authorization module 238, can be used to assemble a corresponding bundle of services.

In some embodiments, determining of alternative media content can include identifying a corresponding program, channel, and/or channel line-up of the back-up service from competing services offered by competing service providers. It is envisioned that such competitors might enter into agreements for one service provider to provide back-up services to another. Thus, if subscriber equipment experiences an interruption in a terrestrial service, media content of another service can be identified as a suitable substitute. This might include the individual program being presented and/or recorded at the time of the outage, or some suitable substitute.

A determination is made as to whether the alternative media content has been provisioned to the affected subscriber(s) at 308. Note that in some instances, the alternative media content may not require provisioning. For example, reliance on over-the-air broadcast services and/or Internet services may not require provisioning. If the services have not been provisioned, they are can be at least temporarily provisioned at 310. Provisioning can be based on one or more parameters, such as a subscriber's identity, a subscription service, e.g., a terrestrial service that provides an alternate service, such as a DBS service, as a back-up service. Parameters can also include authorizations from one or more of the terrestrial service provider, the back-up service provider, a nature of the event, a time of the event, a time duration of the event, and/or the media content to be backed up. In some instances, a terrestrial subscriber may be watching on-demand content at the time of an outage. Depending on a level of subscription, and/or an availability of the particular on-demand content item, the back-up service may be provisioned. In some embodiments, the provisioning includes a transfer and/or activation of a key to access, decrypt or otherwise descramble media services of the back-up service provider.

It is envisioned that in some instances, the back-up service can be offered as an option to a terrestrial service plan. For example, the terrestrial service provider can coordinate access to back-up content, and offer access on an individual subscription basis. Alternatively or in addition, the terrestrial service provider can offer the back-up service to one or more regions, providing the back-up provisioning at transport and/or network access points. Back-up services can be provided according to a particular program, a particular genre, e.g., sports, news, syndicated series, movies, particular channels, e.g., MSNBC®, and/or a channel line-up that may correspond to a portion of a terrestrial subscription plan, or the entire channel line-up of the terrestrial subscription plan.

In some embodiments, costs related to the provisioning can be assessed at the time of provisioning, at regular intervals, as within monthly bills, or as a flat-rate. The costs can be based on one or more of a number of access/authorizations of a back-up service, a duration of any accesses, an identity of the media content item(s), e.g., genre, and a size and/or quality, e.g., small-screen, standard definition, high definition, 4K etc.

Once provisioned, the back-up media content is directed to the media presentation equipment at 312. This can include facilitation of an IP packet stream as a multicast and/or as a unicast. The back-up services app 209 can be configured to receive and present the back-up service multicast and/or unicast during any interrupts to the terrestrial service.

In some embodiments, one or more of the back-up services app 209, the detector 250, or service provider equipment continue to monitor the original terrestrial service to determine when service resumes. The monitoring can be accomplished by one or more of the back-up services app 209, the detector 250, service provider equipment, the smart TV 116, 208, and the like, according to any of the monitoring techniques disclosed herein, or otherwise generally known. The monitoring of a resumption of services can be accomplished by the same equipment that detected the outage, or by different equipment. The back-up services app 209, and/or a control module of the DBS processor 230 can be configured to return to presentation of the terrestrial subscribed services in response to a signal and/or determination that the terrestrial subscribed services are available. Such determinations can include one or more metrics or measurements, such as a time delay between detection of availability and switchover.

Figure 4:
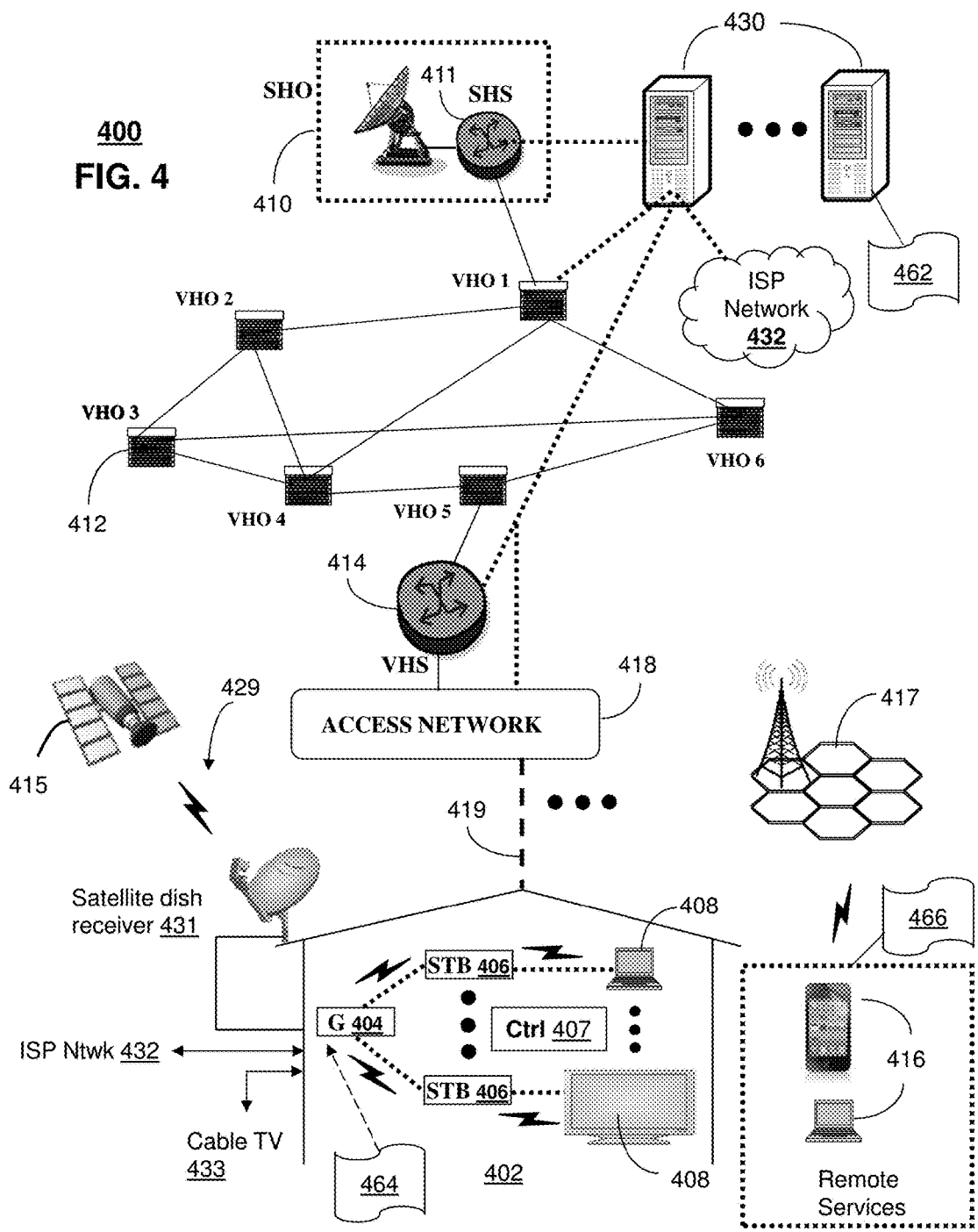
FIG. 4 depicts an illustrative embodiment of a communication system for providing media services that can be accessed by the systems of FIGS. 1-2.

FIG. 4 depicts an illustrative embodiment of a first communication system 400 for delivering media content. The communication system 400 can represent an Internet Protocol Television (IPTV) media system. Communication system 400 can be overlaid or operably coupled with the satellite communication systems 100, 200 of FIGS. 1 and/or 2 as another representative embodiment of communication system 400. For instance, one or more devices illustrated in the communication system 400 of FIG. 4 can coordinate back-up media service as a substitute for a terrestrial media service during up-stream outages that occur in the terrestrial service. For example, the system 400 accesses a terrestrial content service comprising delivery of a media content item by way of a terrestrial network to premises 402 of a subscriber of the terrestrial content service, wherein the media content item is presented to media processing equipment 406, 408, 416 of the subscriber. An interruption in the terrestrial content service is determined that interrupts the delivery of the media content item to the premises 402 of the subscriber. An alternative media content item is identified based on the media content item, wherein the alternative media content item is available by way of a direct broadcast satellite service providing services by way of a satellite transponder 415, wherein the direct broadcast satellite service is not subscribed to by the subscriber. The direct broadcast satellite service is provisioned to the premises 402 of the subscriber responsive to the determining of the interruption in the terrestrial content service. The provisioning can be temporary, e.g., as in a duration of the outage, a duration of a subscription, or according to a schedule. The alternative media content item is presented to the media processing equipment of the subscriber for the duration of the interruption.

In some embodiments, the mobile communication device 416 includes functionality 466 that implements one or more of the techniques disclosed herein. For example, the mobile device 416 can facilitate one or more of access to and coordination of backup services.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller). In some embodiments, the gateway 404 includes functionality 464 that implements one or more of the techniques disclosed herein.

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a back-up service server 430 that facilitates access to a back-up media service as a substitute for a terrestrial media service during up-stream outages that occur in the terrestrial service. The server 430 can implement functionality 462 that facilitate one or more of authorization and billing associated with the back-up services. Alternatively or in addition, the server 430 can implement functionality 462 that identifies substitute media content that can include substitute media for one or more of a media content item, a media channel, or a media channel line-up. In some embodiments, the substitute media content includes substitutes for particular programs or media content items currently being accessed by terrestrial subscribers. The substitute programming can include the same media content item(s) according to the same format(s), the same media content item(s) according to different format(s), similar media content item(s). Similar media content items can include substituting a national broadcast of a sporting event with a regional and/or local broadcast, e.g., by another network. Similar media content can include content selected according to one or more of a genre, a director, a producer, a studio and or producer, a time period and the like.

It is understood that in at least some instances, any substitute media content of the back-up service may not be synchronized with the terrestrial services. Such delays can be up to several seconds, e.g., due to network delays, satellite signal transit time, and so forth. Viewer impact of any delays can be mitigated, at least to some extent, by the use of one or more buffers. For example, a circular buffer can be used to store one or more of the terrestrial content or the back-up content to manage or otherwise eliminate a perceived delay during one or more of a transition to the back-up service and a resumption to the original terrestrial service.

In some embodiments, the server 430 monitors provision of terrestrial services to determine when back-up services should be applied or otherwise provisioned to subscribers. Any monitoring for outages or interruptions can include receiving a notification, as in a message or signal from one or more of terrestrial network nodes, and subscriber premises equipment, including a message from the back-up services app 209.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
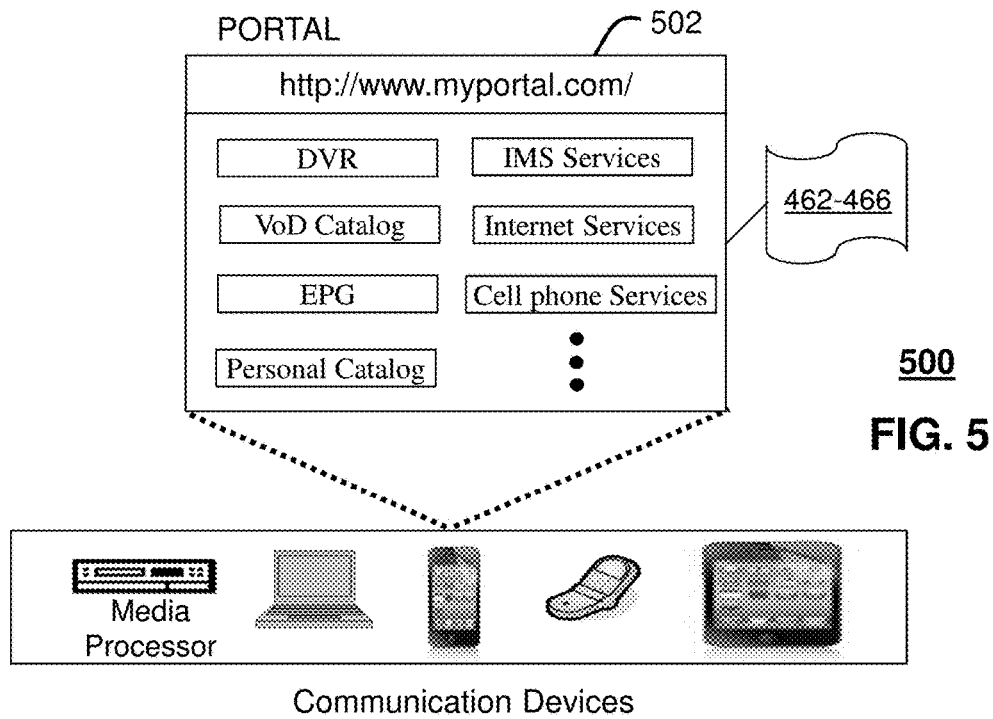
FIG. 5 depicts an illustrative embodiment of a web portal for interacting with the communication systems of FIGS. 1-2 and 4.

FIG. 5 depicts an illustrative embodiment of a web portal 502 of a communication system 500. Communication system 500 can be overlaid or operably coupled with systems 100, 200 of FIGS. 1, 2 and/or communication system 400 of FIG. 4 as another representative embodiment of systems 100, 200 of FIGS. 1 and/or 2 and/or communication system 400. The web portal 502 can be used for managing services of systems 100, 200 of FIGS. 1 and/or 2 and communication systems 400. A web page of the web portal 502 can be accessed by a Uniform Resource Locator (URL) with an Internet browser using an Internet-capable communication device such as those described in FIGS. 1 and/or 2 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 462-466 to adapt these applications as may be desired by subscribers and/or service providers of systems 100, 200 of FIGS. 1 and/or 2, and communication system 400. For instance, users of the services provided by the web portal 502 can include one or more of subscribers, terrestrial service providers, back-up service providers and media content providers. Users can log into on-line accounts to manage resources associated any of various features that a user may want to program such as loss of signal triggers, alternate content preferences, user identity and/or account information, user profiles, providing contact information to server to enable it to communication with the smart TVs 116, 208, 406 described in FIGS. 1-2 and 4, and so on. Service providers can log onto an administrator account to provision, monitor and/or maintain the systems 100, 200, 400 of FIGS. 1, 2 and/or 4, e.g., to manage functionality of the server 430.

Figure 6:
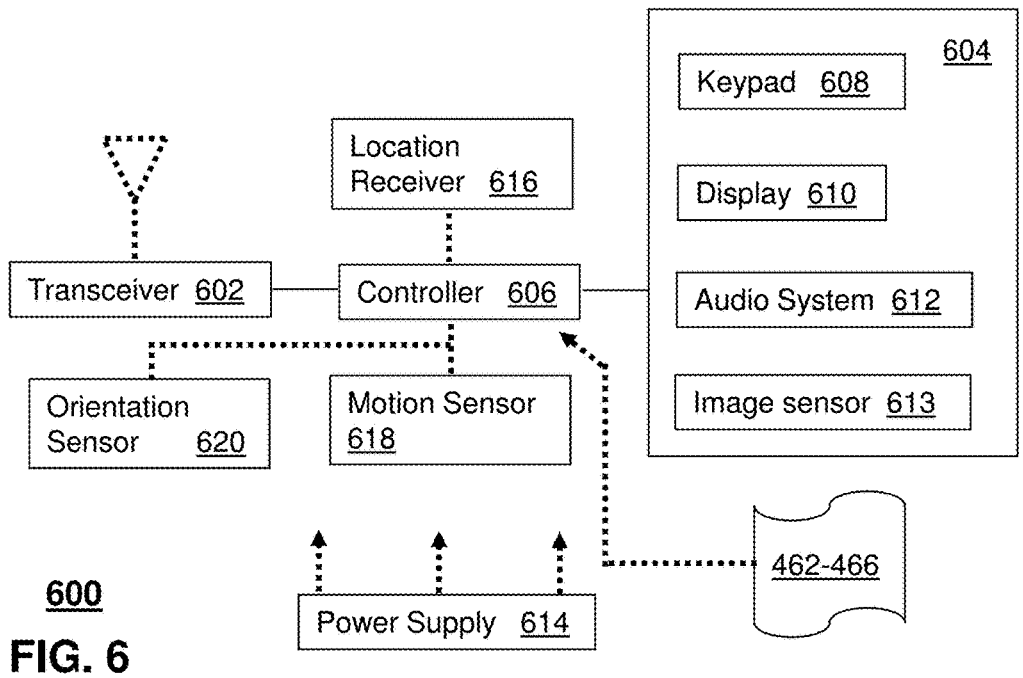
FIG. 6 depicts an illustrative embodiment of a communication device.

FIG. 6 depicts an illustrative embodiment of a communication device 600. Communication device 600 can serve in whole or in part as an illustrative embodiment of the devices depicted in systems 100, 200, 500 of FIGS. 1, 2, 4, and FIG. 5 and can be configured to perform portions of the process 300 of FIG. 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

Upon reviewing the aforementioned embodiments, it would be evident to an artisan with ordinary skill in the art that said embodiments can be modified, reduced, or enhanced without departing from the scope of the claims described below. For example, the content replacement techniques disclosed herein for DBS satellite service can be applied to other services, as well, including terrestrial services. Outages experienced in such services can be detected and/or predicted and backed up in a similar manner. Consider, for example, a cable service, or other terrestrial service, such as FiOS or U-Verse that experiences a loss of signal and/or content. Substitute content obtained from an Internet version of the service, e.g., providing the same or comparable channel lineup, and provided to subscriber equipment during the detected outage. Alternatively or in addition, alternative or replacement content can be obtained from subscriber premises equipment, such as a DVR of the same subscriber, a neighbor, or more generally, a subscriber for which such back-up services are coordinated.

In some embodiments, it is envisioned that one satellite service can be replaced with another satellite service. Such substitutions can be available for installations having multiple satellite terminals, e.g., pointing to different satellites at different orbital positions. Thus, when one satellite terminal may be experiencing a solar fade associated with a first satellite, the other satellite terminal may not be experiencing a solar fade, thus being available for service. Without limitation, transponder resources of the two different satellites may be providing satellite services of the same satellite service provider, different providers, or both. For situations in which substitute media is obtained from a different service provider, it is understood that such substitutions may require agreements for provisioning of services, authorizations, assessments of fees, billing, etc.

In some embodiments, it is envisioned that one satellite service can be replaced with another satellite service of the same satellite. For example, a satellite terminal might include one dish antenna equipped with multiple feeds. The feeds can be distinguished by one or more of polarizations, frequency bands, focal positions, and the like. Consider services provided at a first frequency band and/or polarization that might be impacted by a weather event, such as precipitation. To the extent that the other service operates at a different frequency band and/or polarization, the other service may not be impacted by the same weather event, such that it would be available as a replacement. It is also understood that one dish antenna can include multiple feeds positioned at different focal locations that can point to different satellites. Accordingly, an interruption of service from one of the feeds of a first satellite can be replaced by service from another feed of another satellite. Once again, such substitutions may require agreements for provisioning of services, authorizations, assessments of fees, billing, etc.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
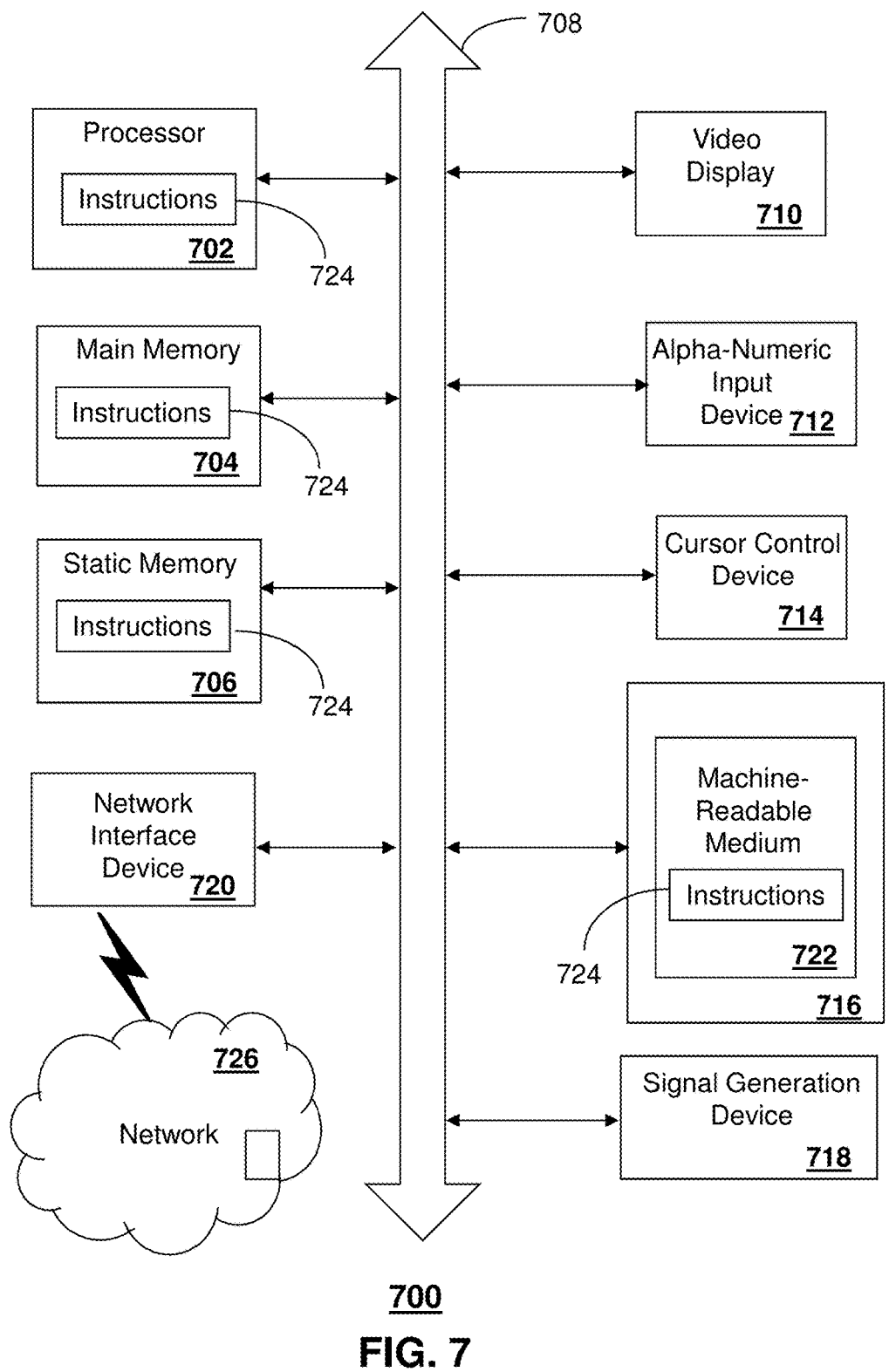
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machines can operate, for example, as the integrated media controller 102, any of the modules of the controller 122, 124, 128, 130, 136, 140, the smart TV 116, the server 430, and other devices of FIGS. 1-2 and 4-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
    a processing system including a processor; and
    a memory that stores executable instructions that, when executed by the processing system, facilitate performance of operations, comprising:
        detecting an interruption in a terrestrial content service that interrupts delivery of a media content item to media processing equipment of a subscriber;
        identifying an alternative media content item similar to the media content item, wherein the alternative media content item is available by way of a direct broadcast satellite service, and wherein the direct broadcast satellite service is not subscribed to by the subscriber and is subscribed to by a different subscriber; and
        responsive to the detecting of the interruption, provisioning direct broadcast satellite equipment of the different subscriber to obtain a provisioned service that facilitates access to a direct broadcast satellite service, wherein an alternative media content item is obtained by the provisioned service and forwarded to the media processing equipment of the subscriber.

2. The system of claim 1, wherein the operations further comprise:
    determining that the media processing equipment cannot process data formatted according to the direct broadcast satellite service;
    reformatting the alternative media content item formatted according to the direct broadcast satellite service to obtain an updated alternative media content item having a format compatible with the media processing equipment; and
    sending the updated alternative media content item to the media processing equipment.

3. The system of claim 2, wherein the reformatting comprises:
    collecting packets of the direct broadcast satellite service that correspond to the alternative media content item;
    assembling the packets as an output transport stream;
    formatting the output transport stream as a multicast signal; and
    provisioning the multicast signal to direct the output transport stream to the media processing equipment of the subscriber.

4. The system of claim 1, wherein the operations further comprise:
    determining an availability of the terrestrial content service delivering the media content item to the media processing equipment of the subscriber; and
    terminating the provisioning of the direct broadcast satellite service to the media processing equipment of the subscriber responsive to the availability of the terrestrial content service, wherein the media content item, instead of the alternative media content item, is presented to the media processing equipment of the subscriber.

5. The system of claim 4, wherein the detecting of the interruption in the terrestrial content service is based on a first prediction of an occurrence of a first event that can result in the interruption, and wherein the determining of the availability of the terrestrial content service is based on a second prediction of an occurrence of a second event that can result in the availability.

6. The system of claim 1, wherein the operations further comprise:
    identifying an attribute of the media content item;
    comparing the attribute to other attributes of a plurality of alternative media content items to obtain a comparison; and
    identifying the alternative media content item based on the comparison, wherein a first subject matter of the media content item differs from a second subject matter of the alternative media content item.

7. The system of claim 6, wherein the attribute comprises a title, a category, a portrayed party, an actor, a producer, a studio, or a combination thereof.

8. A method, comprising:
    detecting, by a processing system comprising a processor, an interruption in a first content service that interrupts a delivery of media content item to media processing equipment of a subscriber;
    identifying, by the processing system, an alternative media content item based on the media content item, wherein the alternative media content item is available by way of a wireless service, wherein the wireless service is not subscribed to by the subscriber and is subscribed to by a different subscriber; and
    provisioning, by the processing system, wireless service equipment of the different subscriber to obtain a provisioned service that facilitates access to the wireless service, wherein the alternative media content item is obtained by the provisioned service and forwarded to the media processing equipment of the subscriber responsive to the detecting of the interruption in the first content service.

9. The method of claim 8, wherein the wireless service is received at the media processing equipment of the subscriber, by way of the wireless service equipment at premises of the different subscriber.

10. The method of claim 8, wherein the wireless service equipment of the different subscriber:
    collects packets of the wireless service that correspond to the alternative media content item;
    assembles the packets as an output transport stream;
    generates a multicast of the output transport stream; and provisions the multicast to the media processing equipment of the subscriber.

11. The method of claim 8, further comprising:
determining, by the processing system, an availability of the first content service delivering the media content item to the media processing equipment of the subscriber; and
terminating, by the processing system, the provisioning of the wireless service to the media processing equipment of the subscriber responsive to the availability of the first content service, wherein the media content item, instead of the alternative media content item, is presented to the media processing equipment of the subscriber.

12. The method of claim 8, wherein the detecting of the interruption in the first content service is based on delivery of a placard screen in place of the media content item.

13. The method of claim 8, further comprising:
identifying, by the processing system, a characteristic feature of the media content item;
comparing, by the processing system, the characteristic feature to other characteristic features of a plurality of alternative media content items to obtain a comparison; and
identifying, by the processing system, the alternative media content item based on the comparison.

14. The method of claim 13, wherein the media content item and the alternative media content item are different, and wherein the characteristic feature comprises a title, a category, a portrayed party, an actor, a producer, a content source, a format, or a combination thereof.

15. A machine-readable storage device, comprising executable instructions that, when executed by processing system including a processor, facilitate performance of operations, comprising:
detecting an interruption of a first media content service at a media processor of a subscriber;
identifying alternative media content based on user-subscribed media content, wherein the alternative media content is available by way of a direct broadcast satellite service to which the subscriber is not subscribed and to which a different subscriber is subscribed; and
provisioning direct broadcast satellite equipment of the different subscriber to obtain a provisioned service that facilitates access to the direct broadcast satellite service, wherein the alternative media content is obtained by the provisioned service and forwarded to the media processor of the subscriber, responsive to the detecting of the interruption.

16. The machine-readable storage device of claim 15, wherein the direct broadcast satellite service is received by way of a direct broadcast satellite terminal at the media processor of the subscriber, and wherein the alternative media content is not subscribed to by the different subscriber through the direct broadcast satellite service.

17. The machine-readable storage device of claim 15, wherein the operations further comprise:
collecting packets of the direct broadcast satellite service that correspond to the alternative media content;
assembling the packets as an output transport stream;
generating a multicast of the output transport stream; and
provisioning the multicast to equipment of the subscriber.

18. The machine-readable storage device of claim 15, wherein the operations further comprise:
determining an availability of the first media content service comprising the user-subscribed media content; and
terminating the provisioning of the direct broadcast satellite service to the media processor of the subscriber responsive to the availability of the first media content service, wherein the user-subscribed media content, instead of the alternative media content, is presented to equipment of the subscriber.

19. The machine-readable storage device of claim 18, wherein the detecting of the availability of the first media content service is based on a first prediction of an occurrence of a first event that can result in the interruption, and wherein the determining an availability of the first media content service is based on a second prediction of an occurrence of a second event that can result in the availability.

20. The machine-readable storage device of claim 15, wherein the operations further comprise:
identifying an attribute of the user-subscribed media content, wherein the attribute comprises a title, a category, a portrayed party, an actor, a producer, a studio, or a combination thereof;
comparing the attribute to other attributes of a plurality of alternative media content options to obtain a comparison; and
identifying the alternative media content from among the plurality of alternative media content options based on the comparison.

* * * * *